Nov. 3, 1964 D. T. KELLEY 3,155,272

METHOD AND APPARATUS FOR LOADING A RECEIVER WITH A PLURALITY OF BEADS

Original Filed April 24, 1958 4 Sheets-Sheet 1

INVENTOR.
DALE T. KELLEY
BY Mueller & Aichele
ATTORNEY

INVENTOR.
DALE T. KELLEY
BY Mueller & Aichele
ATTORNEY

INVENTOR.
DALE T. KELLEY
BY Mueller & Aichele
ATTORNEY

Nov. 3, 1964 D. T. KELLEY 3,155,272

METHOD AND APPARATUS FOR LOADING A RECEIVER WITH A PLURALITY OF BEADS

Original Filed April 24, 1958 4 Sheets-Sheet 4

INVENTOR.
DALE T. KELLEY
BY Mueller & Aichele
ATTORNEY

United States Patent Office 3,155,272

Patented Nov. 3, 1964

3,155,272

METHOD AND APPARATUS FOR LOADING A RECEIVER WITH A PLURALITY OF BEADS

Dale T. Kelley, Phoenix, Ariz., assignor to Motorola, Inc., Chicago, Ill., a corporation of Illinois Original application Apr. 24, 1958, Ser. No. 730,642. Divided and this application Nov. 24, 1961, Ser. No. 154,511

9 Claims. (Cl. 221—1)

This invention relates to manufacturing and structural improvements in the semiconductor art, wherein the devices produced for use in electronic equipment are of diminutive size, and more particularly to alloy junction transistors of such size, as well as to an improved method for making such devices, and to apparatus for practicing such method. The invention provides a highly mechanized, efficient and economical assembly operation and a device which lends itself to mass production, while permitting changes in the semiconductor subassembly within the device to permit a ready change to many different predetermined operating characteristics for the device which make it possible to adapt the same to many different equipment application specifications. This flexibility is accomplished by the present invention with only minor changes in the process, manufacturing apparatus, and device structure itself.

This application is a division of a copending application of Dale T. Kelley, Serial No. 730,642, filed April 24, 1958, and assigned to the present assignee.

In order to obtain certain electrical characteristics such as good high frequency response, it is desirable, in the present state of the art, to make a transistor quite small, or one might say, relatively minute. The manufacture of such relatively minute devices poses many practical fabrication problems due to the size of the articles being assembled. Since a transistor normally includes several separate parts, the assembly process involves the alignment and connection of such parts in an accurate and uniform manner. Because the parts being assembled often have dimensions of only a few hundredths or even thousandths of an inch, their accurate positioning is extremely difficult. For example, certain alloy junction transistors include a wafer or die of a semiconductor materias such as silicon or germanium which carries on its opposite faces minute electrodes of an impurity metal such as indium. The electrodes must be positioned accurately directly opposite one another on the germanium or silicon die, and then heated so that they will fuse to the surface of the semiconductor die and alloy into it a controlled distance in order to create two suitable certifying junctions. Suitable lead wires must be electrically connected to each electrode in order to connect the device into a circuit. Since the diameter of the electrodes is often in the order of about 0.01 inch, it is difficult to align them directly opposite one another and it is equally difficult to position the lead wires accurately and secure them to the electrodes.

For instance, in a device wherein a semiconductor die carrying alloyed electrodes is connected to a mounting to form a subassembly which in turn is secured to the posts of a mounting header for the complete device, the small size of the parts involved, makes proper alignment of the subassembly with the header posts difficult. Its successful accomplishment in prior practices requires the use of expensive special jig and assembly equipment such as lead attaching pantographs which greatly reduce applied motion and thus permit relatively accurate positioning of the component parts, and prior practices require skilled labor when they are assembled by hand. Such hand assembly methods are slow and add materially to production costs. Of equal, or possibly of greater importance, is the matter of producing relatively minute semiconductor devices in the large commercial quantities required, and attaining uniformity in assembly and in operating characteristics for a particular design. Failure to solve this problem in this art has kept the manufacturing yield rate low, and kept the cost of the accepted units high.

Accordingly, it is a highly desirable objective to eliminate hand assembly and utilize mechanized or automatic assembly techniques in the manufacture of semiconductor devices such as transistors, but the accomplishment of the objective has left much to be desired in the past.

Another highly desirable objective in semiconductor device manufacture is the standardization of assembly procedure and equipment. At present, most commercial assembly procedures and equipment are relatively inflexible and can be used to manufacture only one or a few specific devices. Since the state of the art is advancing quite rapidly, they quickly become obsolete. Consequently, substantial savings in capital investment for new equipment could be made if the same or slightly modified equipment could be used in the manufacture of devices having different types of semiconductor die units and consequently different operating characteristics for equally different applications in electronic equipment. This is particularly important in this art, because relatively it is in its infancy and electronc equipment must be developed to utlize the semiconductor devices. With the development of equipment new devices are required. In all, it is a rapidly advancing art where there has been great obsolescence in methods, manufacturing apparatus, and devices as the art advances.

It is an object of this invention to provide a method of assembling semiconductor devices, which method is characterized by great flexibility and by rapid and simple adaptation to the manufacture of a variety of different devices, and particularly to the manufacture of low and medium power transistors with alloy junctions, so that the same methods and assembly apparatus can be used over a substantial period of time in this rapidly advancing art as changes are made in the operating characteristics or structure of the devices.

A further object of this invention is to provide a manufacturing process and apparatus for diminutive alloy junction semiconductor devices which accomplishes mass production and low cost but a higher yield at the completion of the process than has been possible in the past.

A further object of the present invention is to provide a transistor structure which lends itself to relatively quick and easy assembly of its minute component parts by the use of relatively simple apparatus so as to maintain capital expenditures for apparatus at a minimum.

A feature of this invention is the provision of a method of assembling alloy junction transistors which improves the accuracy with which electrodes may be positioned on a semiconductor die and suitable leads affixed to the electrodes so as to provide a uniform product coming from an assembly line, and accomplish a high yield and lower costs of manufacture while speeding up the required full production time relative to the yield accomplished.

Another feature of the invention is the provision of a method and apparatus for affixing minute metal electrode beads to an accurately predetermined portion of the surface of a semiconductor die by placing the die between two halves of a jig having passages entirely therethrough so that beads for forming the electrodes can be placed on the die in the desired position simply by dropping them through the passages in the jig whose bores serve as guide means, heating the jig and the contained die and electrode bead to alloy the bead to the die at the desired position, subsequently inserting lead wires through the passages guided by the bores thereof to rest by their own weight on the surfaces of the electrodes, and fusing the leads to the electrodes. This method and apparatus eliminates a manual alignment of the small component parts for the device thus reducing labor costs, and also improves production yields.

A further feature of the invention is the provision of a filling apparatus for loading the minute electrode beads into the jig and a method of operating the apparatus which includes first aligning a plurality of beads in registry with holes in the surface of a vacuum chamber therein so that the beads are held in the desired position by the vacuum within the chamber, and then moving the chamber so that the vacuum-held beads can be placed adjacent the ends of the passages in the jig which has been moved below the chamber, after which the beads are dropped therein by release of the vacuum.

A still further feature of this invention is the provision of relatively inexpensive equipment including the jigs and loading apparatus described to obtain a high degree of accuracy of alignment in the assembly of all of the diminutive transistor parts, and the provision of a transistor structure which lends itself to handling by such equipment.

Figures 1, 2, 3, 4, 5, 6:
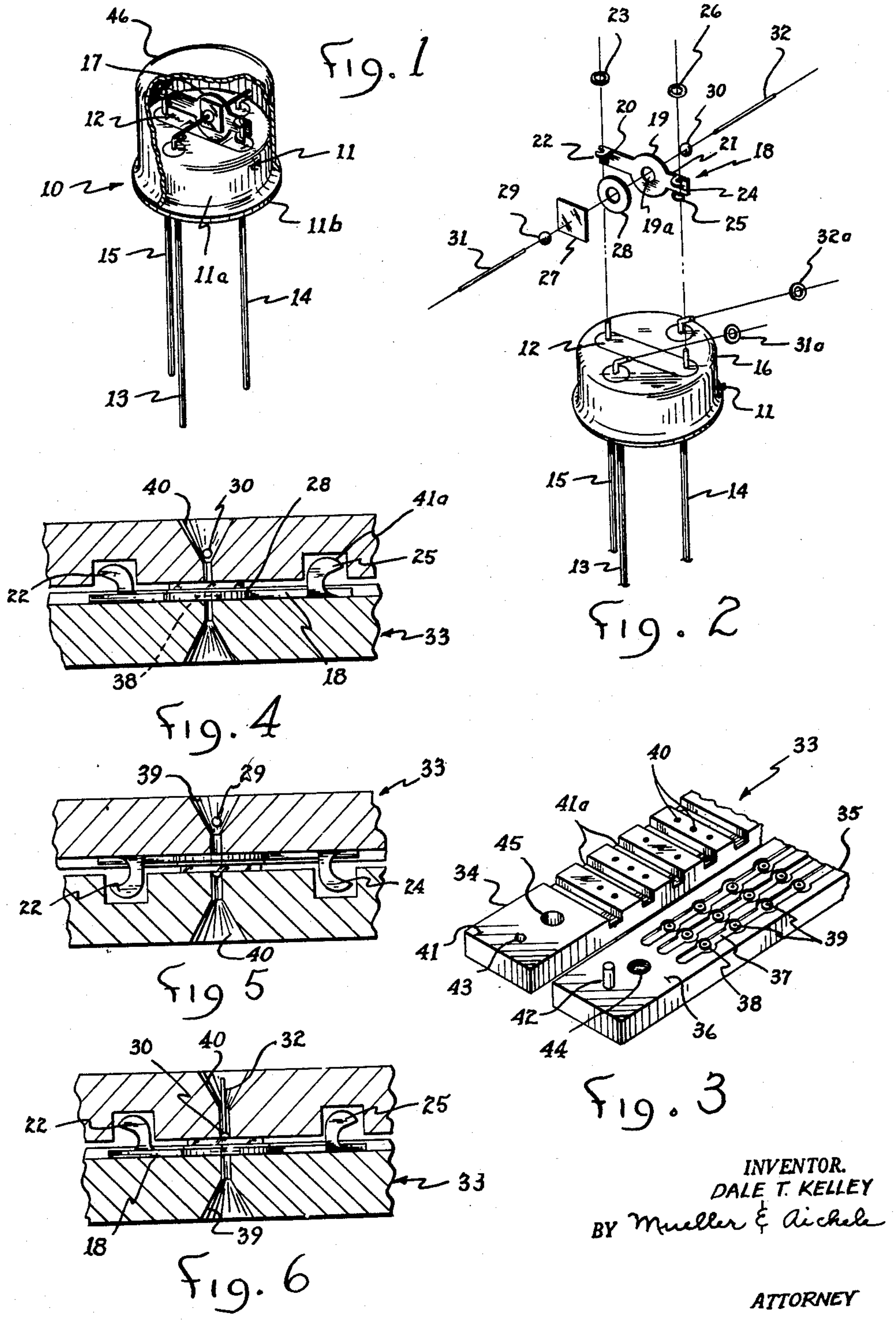
FIG. 1 is a greatly enlarged view in perspective of a transistor of the present invention with its cover member broken away to show its internal structure.
FIG. 2 is an exploded view of the transistor shown in FIG. 1, with the same enlargement to better illustrate the components making up the unit.
FIG. 3 is an enlarged perspective broken view of one end of each half of a heat resistant jig or boat employed for guiding the pieces to be secured together by fusion or alloying into the semiconductor die unit in an assembly step of the present invention, showing the two halves of the jig in open position.
FIG. 4 is a fragmentary view in section through a closed jig of the type shown in FIG. 3, but enlarged over the showing in FIG. 3, and illustrating the dropping of a minute metal bead toward one face of a semiconductor die.
FIG. 5 is a view similar to FIG. 4 showing the dropping of the other electrode bead toward a position on the opposite face of the semiconductor die.
FIG. 6 is a view in section similar to FIGS. 4 and 5 showing the positioning for affixing of a lead wire to one of the electrodes which is then alloyed onto a face of the semiconductor die.

In practicing the present invention as directed particularly to a method for making alloy junction devices such as so-called transistors and such devices resulting therefrom, I provide a production line over which manufacturing steps are accomplished with a maximum of automatically operated equipment or apparatus and a minimum of hand labor to provide mass production of these diminutive or relatively minute devices wherein a high degree of uniformity in structure and electrical operating characteristics are accomplished. This in turn provides a high yield in terms of acceptable units coming from the mass production operation.

The minute parts of a semiconductor subassembly are assembled in large multiples and primarily by automatically operated apparatus into heat resistant jigs which are then each moved into fusion furnaces for the heating and fusion together of semiconductor subassemblies. The collector and emitter electrodes and the wire leads extending therefrom are the most critical so far as the position thereof on the semiconductor die and so far as the fusion thereof together are concerned, and accuracy of position and complete fusion are accomplished by loading and then fusion of first one electrode and then the other, and then loading and fusion of one wire lead on an electrode and thereafter the other wire lead on the other electrode. In this manner each handling of a piece or part can be brought up to maximum efficiency and each of the four fusion furnaces used for the two electrodes can be provided with an atmosphere and a temperature to accomplish the best fusion conditions for the different electrodes.

After completion of the subassembly, and at subsequent loading positions in the production line, the mounting member or header for the semiconductor devices such as a transistor, and the semiconductor subassembly are placed together and this is automatically moved into a fifth fusion furnace for soldering together which accomplishes the assembly of all mechanical parts of the device except the final cover or can.

With the mechanical assembly complete, each device in this stage of completion is automatically electrolytically etched for cleaning, is washed to remove the solution, and electrically tested. Then a cover is placed on those assemblies which have not been rejected at the electrical testing stations for unacceptable characteristics or inoperativeness.

This invention also includes an improved device-structure which emphasizes the effectiveness of the process and apparatus just described. The semiconductor subassembly for such device includes a flat enlarged metal strip which not only serves as part of the mechanical mounting means for the subassembly on a mounting header as well as an electrical connector, but lends itself to the production of a plurality of subassemblies in an improved single heat-resistant jig. A plurality of such strips are placed in the jig and quickly aligned in a proper position so as to receive first a semiconductor die on each strip, and then metal electrode beads to be fused thereto, and lead wires to be fused to the electrodes so that electrical connections can be made to the semiconductor subassembly. The connector strip serves to mount a semiconductor die and additionally includes hooks on each end by which the final subassembly can be readily and simply positioned on corresponding posts of the mounting header.

The mounting header also represents an advance in the art of commercial importance in that four posts are equilaterally mounted therein and two of the four posts on the header are bent over at an angle to receive the wire leads from the subassembly while the connector strip hooks are positioned on the straight posts to center that element, wherein the subassembly is held in position on the header prior to and during final soldering. The four posts are insulated in the header from a metal covering, and an insulating portion between the straight posts extends through such covering and between such two posts so that the strip will not be short circuited with the covering. In this respect, the configuration of the connector strip in combination with the header also facilitates the final assembly. The semi-conductor die on the strip is off-center. Although the four posts in the mounting header are secured therein in an equilateral position, the off-center arrangement of the semiconductor die on the connector strip insures that the thin wire leads extending in opposite directions from the electrodes thereon rest securely in the extended turned-over portion of each of two of the posts. Each such portion slopes toward the base portion of the post which is in the equilateral position described. As a result, the positioning of the semiconductor subassembly on the mounting header can be rapid because of the tolerances provided by the length of each turned-over portion. Solder material is at the joints and the subassembly settles down the sloping portion into a rigid predetermined position on the header when the solder is melted in the fifth fusion furnace.

Not only does the complete mechanical structure of the device of this invention lend itself to quick and accurate assembly without jigs except the heat resistant block unit, but this same structure and the soldered connections of the subassembly to the header make it possible to heat and unsolder this subassembly from the header if the final electrical test before canning shows the subassembly to be unacceptable from an electrical and operating standpoint. Being able to salvage the header represents a substantial saving in cost of manufacture, and adds to other savings represented in the complete embodiment of the invention.

FIG. 1 of the accompanying drawings shows a perspective view of a completed transistor of the present invention with the cover portion broken away. FIG. 2 is an exploded view of the same transistor more clearly showing its component parts. The transistor generally indicated at 10 includes a mounting header 11 which comprises a disc-like member 12 of glass or other suitable insulating material covered with a sheet of metal 11*a* such as the alloy "Kovar" except for the areas immediately adjacent the mounting leads or posts and an elongated area between two of the posts. Passing through the glass disc and supported therein are the header mounting leads or posts including the emitter lead or post 13, the collector post 14, and the base post 15. A fourth post 16 also is held in the header but does not pass completely through it as do the other posts, and serves no electrical purpose but acts merely as a convenient mechanical support. The posts 13–16 are of a suitable conductive metal or alloy such as an iron-nickel alloy which can be sealed to the insulating material of the mounting base.

The subassembly generally indicated at 17 is mounted on the posts 13–16 and is made up of the base connector and die supporting member 18 which itself comprises a round enlarged or extension portion 19 and extending arm portions 20 and 21. Arm 20 is somewhat longer than arm 21. The portion 19 of the base connector 18 is provided with an opening 19*a*. The arm 20 is provided with a hook member 22 adapted to engage the base post 15 and is soldered thereto. Soldering may be accomplished with a solder ring 23 (shown in FIG. 2) or by other solder applications lending themselves to mass production. The arm 21 is provided with a pair of hooks 24 and 25 which engage the post 16 and are soldered to it by means of a solder ring 26, or other suitable soldering as described for the connection on post or lead 15. The base connector member, in accordance with one embodiment of the present invention is made of a nickel-containing alloy "Kovar." However, other suitable conductive material may be used having about the same thermal coefficient of expansion as the semiconductor die and to which the die can conveniently be connected. Metallic nickel is a suitable material.

The subassembly 17 also includes the semiconductor wafer or die 27 which is secured to the enlarged portion 19 along the periphery of opening 19*a* by means of the solder ring 28 which is made of solder of high lead content. The die 27 fits over the opening 19*a* and carries on its faces metal beads which serve as electrodes. The bead 29 serves as the emitter electrode of the transistor while the bead 30 serves as the collector electrode. The subassembly 17 is arranged with emitter electrode 29 extending into opening 19*a*. Emitter lead 31 is fused to emitter electrode 29 while collector lead 32 is similarly secured to collector electrode 30.

The leads 31 and 32 from the subassembly 17 rest on the overturned or sloping ends of posts 13 and 14 respectively, and are soldered to them by a suitable production means as by the melting of solder preforms 31*a* and 32*a*.

The structure of the transistor 10 makes it well adapted to manufacture by automatic assembly techniques, and is suitable for any one of a variety of low or medium power transistors in which the amount of heat generated at the rectifying junctions is small enough to be successfully dissipated through wire leads. Once the subassembly 17 has been separately fabricated, the attachment thereof to the header 11 may be carried out expeditiously in a manner to be described subsequently. However, because of the very small size of the component parts of the subassembly (the overall length of the base connector 18, for example, in one embodiment of the invention is only about 0.200 inch) special techniques are employed which provide for its quick, accurate and economical manufacture. Accuracy of assembly is particularly important since electrical connection is made through the very fine wire leads 31 and 32, which in turn are fused to the very small electrode beads 29 and 30.

Figure 7:
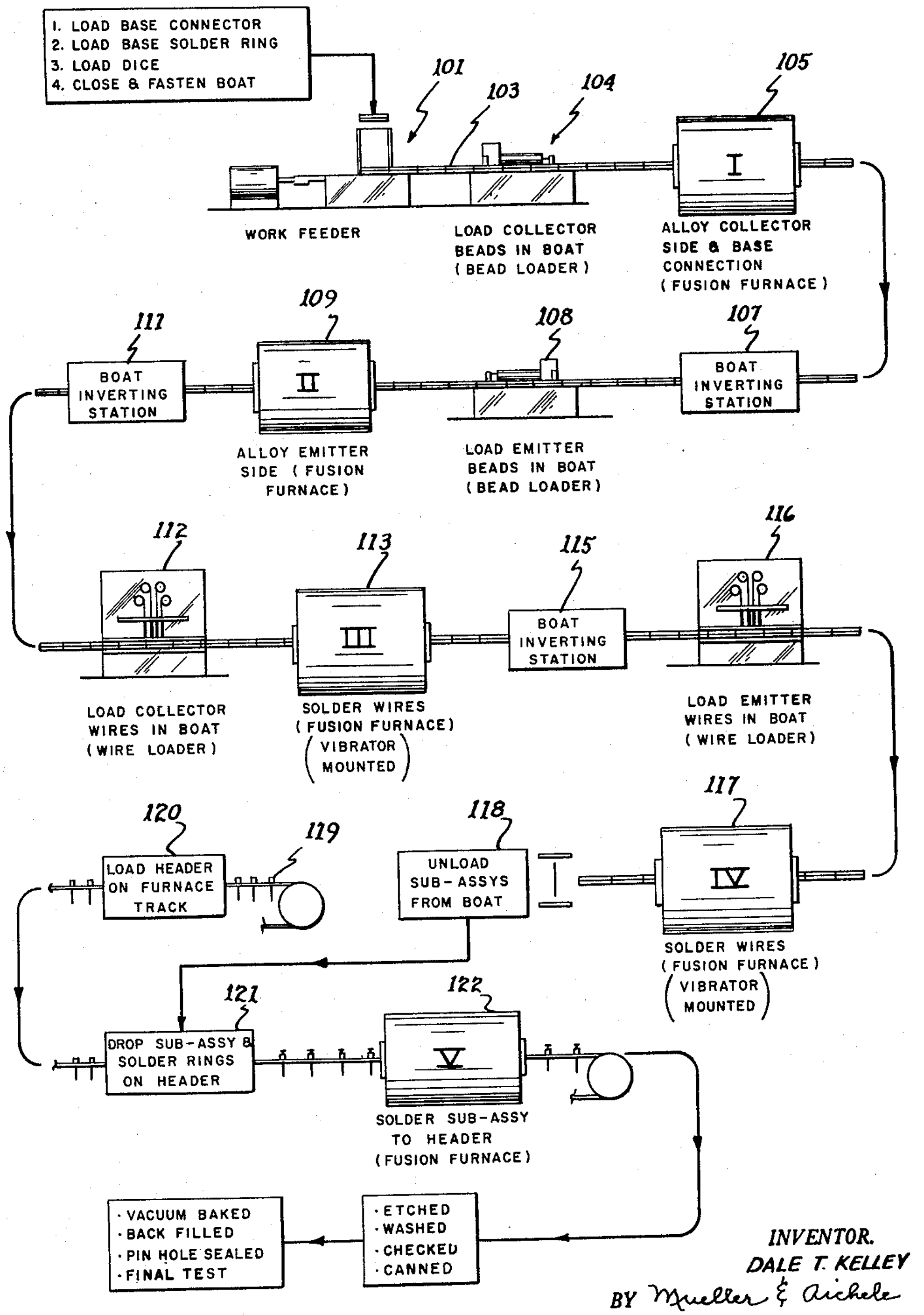
FIG. 7 is a flow sheet illustrating the various steps of the assembly process and showing assembly equipment in diagrammatic form.
Figure 8:
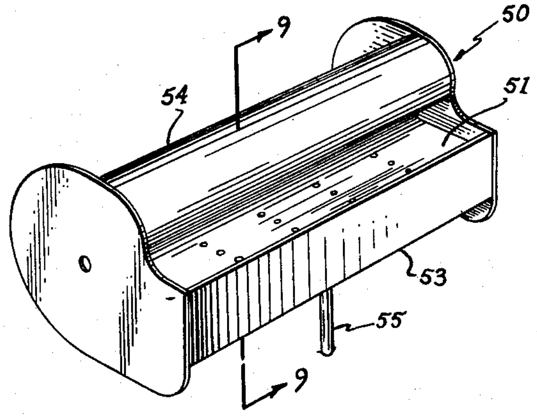
FIG. 8 is a perspective view of loading apparatus of the present invention for loading minute electrode beads onto semiconductor dice for alloying thereto, with the apparatus shown in somewhat diagrammatic form to better illustrate that portion which directly carries the beads.
Figure 9:
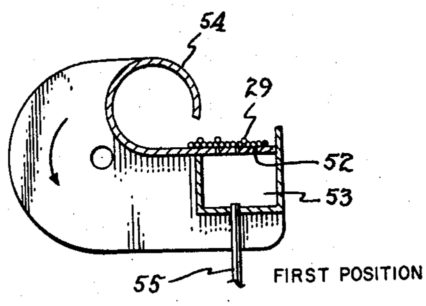
FIG. 9 is a corresponding illustration in section taken on the line 9—9 of FIG. 8 and in the operating position of that figure with a number of electrode beads spaced over a surface of the apparatus.
Figure 10:
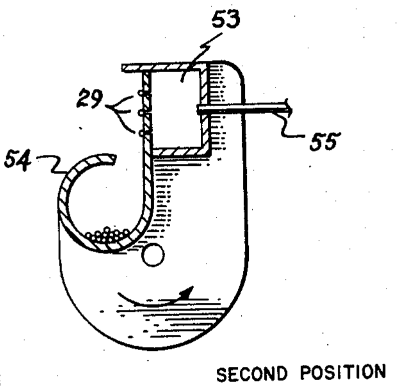
FIG. 10 is a view similar to FIG. 9 showing the apparatus turned through an angle of 90°, and with the electrode beads or pellets held in alignment with openings in the apparatus by differential air pressure.

FIG. 7 shows in diagrammatic form a flow sheet of the various steps of the method of fabricating the subassembly 17. The first step in this process is the positioning of the base connector 18, the solder ring 28 and the semiconductor die 27 in the jig generally indicated at 33 in FIG. 3. This step is accomplished at the loading station 101 on FIG. 7. Solder ring 28 is preferably dipped in a mixture of ammonium chloride and alcohol to provide a flux. The jig 33 is composed of blocks 34 and 35 made of graphite, steel or some other suitable material capable of withstanding heat. The block 35 has formed therein a number of depressions indicated generally at 37 in its face 36, and shaped to accommodate the base connectors 18. The depressions are interconnected so that a number of connectors may be placed end to end to increase the number of subassemblies fused or alloyed together at the same time. A boss 38 is provided to accommodate the opening 19*a* formed in the central portion 19 of the base connector. Each boss member 38 is provided with a central passage 39 which passes all the way through the block 35 providing access to the interior portion of the jig when it is closed.

The block 34 has an essentially flat surface 41 with passages 40 passing completely through the block and adapted for alignment with passages 39 when the jig is closed by placing surface 41 of block 34 on surface 36 of block 35. Transverse grooves 41*a* accommodate the hooks of connector 18. The block 35 is provided with a peg 42 which fits into opening 43 of block 34 when the jig is closed. The two halves of the jig are secured together by a screw or bolt passing through holes 44 and 45.

After a series of base connectors 18 have been placed in block 35 of the jig 33, a solder ring 28 (FIG. 4) is placed on each base connector around the opening 19*a* and a semiconductor die 27 is placed on the solder ring. The semiconductor die 27 is made of germanium or silicon of suitable conductivity type and of predetermined resistivity and electrical characteristics. In a specific embodiment of the present invention, the die 27 is of N conductivity type germanium.

The jig 33 is closed in the manner previously described and passes along conveyor means 103 to the collector electrode insert station 104. A collector electrode bead 30 is dropped through the passage 40 as shown in FIG. 4 and falls onto the surface of die 27. Insertion of the bead 30 is accomplished by means of the filling device of FIGS. 8 to 11 which will be described subsequently. The mouth portion of the passage 40 is somewhat enlarged to facilitate insertion of the bead although its bottom portion is of sufficient width to just accommodate the bead thus guiding it into place and assuring accurate positioning on the surface of the semiconductor die 27. In accordance with a specific embodiment of the invention, the collector bead 30 is composed of indium although other suitable acceptor impurity metals which will alloy into the N conductivity type to form a suitable PN junction may also be employed. For example, when using a semiconductor die of N-type germanium, as in the embodiment particularly described, other alloying acceptor metals such as gallium or zinc or alloys of these metals with indium may be used. In the event P-type germanium or P-type silicon is used in the semiconductor die, a donor-type alloying impurity, such as an antimony alloy, forms the electrodes. A specified amount of ammonium chloride-alcohol fluxing solution is introduced through passage 40 to assist in alloying collector bead 30 to die 27.

The jig 33, now containing, in accordance with one embodiment of the invention, 15 sets of parts, each set including the base connector 18, the solder ring 28, the semiconductor die 27 of N-type germanium, and the indium collector bead 30, is placed in the magazine of the collector furnace 105. Successive jigs are moved through the furnace (in accordance with one embodiment of the invention) by the action of a pneumatic pusher which pushes the last-inserted jig from the magazine causing it to displace the next preceding jig along the furnace. In the furnace, the assembly is heated to melt the solder ring 28 and thus attach the semiconductor die 27 to the base connector 18. The heating also melts the indium collector bead 30 and causes it to alloy into and fuse with the semiconductor die 27. This creates a region of P-type conductivity beneath the surface of the semiconductor die 27 and creates a PN rectifying junction within the die.

The electrical characteristics of an alloy junction type transistor are determined to a considerable extent by the depth of alloying the collector and emitter electrodes since this controls the distance between the PN junction in the semiconductor die. This alloying depth is determined by the volume of alloying material available, the area wet by the alloying material and the alloying temperature. The collector furnace 105 is an electric resistance furnace containing an atmosphere that is inert with respect to the material making up the transistor. In general, such atmospheres are reducing or non-oxidizing. Nitrogen, argon, or a mixture of nitrogen and hydrogen are suitable atmospheres. The temperature maintained within furnace 105 is dependent upon the electrical characteristics to be produced in the transistor since these are, to at least some extent, controlled by the depth of alloying of the indium. In accordance with the present invention, temperatures between about 400° and 700° C. are employed, with high temperatures being used when greater alloying depth is required. In one embodiment of the invention, a temperature of about 580° C. is employed in the collector furnace. In one embodiment of the invention, the total residence time of each jig in the furnace is about 15 minutes with a jig leaving the furnace every 30 seconds. This provides sufficient time to obtain equilibrium alloying at the temperature specified. There is no practical upper limit on the heating period since once the alloying of the indium and germanium is accomplished at a particular temperature, it will not proceed further unless the temperature is raised.

The jig 33 is moved from the cooling chamber of furnace 105 to the jig-turning station 107 where it is inverted either manually or by suitable mechanical means so that the block 35 of the jig is now facing up. The turned jig then passes to the emitter insert station 108 and the emitter electrode bead 29 is dropped through the passage 39 (FIG. 5) so that it rests on the surface of the semiconductor die 27 directly opposite the collector electrode 30. In making transistors in which the emitter electrode is somewhat smaller than the collector electrode, the passage 39 is of somewhat smaller diameter than the passage 40 through which the collector bead 30 was dropped. The passage 39 is also flared at its mouth to make insertion of the electrode bead easier and is narrower near its bottom so that it will serve to properly position the indium bead on the surface of the semiconductor die. As in the case of the insertion of the collector bead, the emitter bead is inserted by the mechanical insertion means of FIG. 8 to be described subsequently. A predetermined amount of the ammonium chloride-alcohol fluxing solution is introduced through passage 39 onto bead 29.

The loaded jig 33 then passes to emitter furnace 109 which is identical with collector furnace 105 and employs the same atmosphere, but it is maintained at a somewhat lower temperature to provide for less alloying penetration of the emitter than the collector.

After the alloying of the emitter electrode 29 has been completed, the jig is turned over at the inverting station 111 and passes to the collector lead insert station 112. At collector lead insert station 112, a collector lead wire 32 is inserted through each passage 40 either by a wire loading mechanism which cuts the leads to length and locks them automatically or by hand, and allowed to rest with its end held against collector electrode 30 by gravity (FIG. 6). The collector lead wire 32 is made of gold-plated silver because of the ease with which indium and and gold wet one another so that they can be electrically connected merely by making contact and heating. Unplated silver wire also may be employed but higher temperatures are required. Positioning of the lead wire 32 is accurate because it is guided by the bore of the passage 40 and automatically positioned thereby on the surface of the collector electrode 30. As shown in FIG. 6, lead wire 32 is of such a length that it does not extend beyond the outer surface of the jig. This permits insertion of the jig without disurbing the position of the lead.

The jig with the lead wire 32 inserted therein is then passed by a pneumatic pusher to collector lead furnace 113 which is also an electric resistance furnace containing a neutral or nonoxidizing atmosphere and maintained at a temperature between about 300° and 400° C. In one embodiment of the invention, a temperature of 380° C. is employed. At this temperature the lead 32 readily fuses to the indium electrode 30 and is mechanically affixed and electrically connected thereto. The lead wires are about one-half the diameter of the electrode to which they are fused. It has been observed that they are well centered with respect to the electrodes and this is believed to be due to the surface tension of the indium as it becomes molten during the fusion process. The residence time in the collector lead furnace is substantially the same as that of the two electrode furnaces.

After the attaching of the collector lead the jig passes inverting station 115 from which it passes to the emitter lead insert station 116. At this point the emitter lead 31 is inserted into the passage 39 in exactly the same way as the collector lead 32 was inserted into the passage 40, and the jig passes to the emitter lead furnace 117 where the silver emitter lead wire is fused to the indium by heating under the same conditions as obtained in the collector lead furnace 113. The jig and its contents are then cooled, and the completed subassemblies 17 are removed at station 118 by opening the jig and separating the blocks.

The completed subassemblies are of a configuration which facilitates their quick and accurate alignment on a slightly modified standard mounting header having four equilaterally spaced mounting posts. As indicated in FIG. 7, headers 11 are loaded in an upright position onto a moving conveyor belt or track 119 at station 120 and pass to the loading station 121. At this position, an operator or a suitable loading mechanism drops a subassembly onto a header with the hooks 24 and 25 of the shorter arm 21 engaging the dummy or electrically inactive post 16 and with the hook 22 of the longer arm 20 engaging the base mounting post 15 (see FIG. 1). Shorter arm 21 is provided with a pair of hooks to enable an operator to distinguish one end of the base connector from the other and so orient successive subassemblies uniformly with respect to the headers on which they are mounted. When the subassemblies are placed on the headers manually, the operator usually engages post 16 first and then slips hook 22 around post 15.

As the subassembly is placed on the header, the emitter and collector leads 31 and 32 contact the turned-over and sloping end portions of emitter and collector mounting posts 13 and 14 respectively. The end portions are bent toward the shorter arm 21 of base connector 18 and form an angle of about 30° with the upper surfaces of the header.

The hooks at the ends of the base connector arms hold the subassembly 17 against lateral movement with respect to the mounting posts and maintain it in proper alignment to be soldered to the header. This soldering may be accomplished by a soldering iron, but is preferably carried out on a more rapid production basis by a preapplication of solder and then heating and fusing in the furnace 122. In one embodiment, solder rings 23 and 26 (FIG. 2) are dropped over posts 15 and 14 respectively onto the hooks engaging these posts, and solder rings 31*a* and 32*a* are dropped over the turned-over sloping ends of posts 13 and 14 to rest against leads 31 and 32 respectively. The resulting units pass along track 119 (FIG. 7) to furnace 122 wherein the solder rings melt to form joints connecting the subassemblies to their headers mechanically and electrically.

As the subassemblies are placed on the headers, they are roughly oriented with the base connector arms substantially parallel to the upper surface of the header. As the solder rings melt, the subassembly 18 will tend to settle into the stable position shown in FIG. 1 as the lead wires 31 and 32 slide along the bent-over end portions of posts 13 and 14 respectively. Because the semiconductor die 27 is carried on connector 18 in a position somewhat off-set from its center toward the same direction in which the turned-over ends of posts 13 and 14 are bent, the lead wires extending from the die will make contact with the posts even if the subassembly is slightly misaligned, and the chance of making a faulty connection to the lead wires is minimized. As the solder melts, the angular disposition of the post ends insures contact by the leads to be maintained as the subassembly 18 settles into its most stable position.

As the subassembly 18 settles during soldering, the edge of the enlarged portion 19*a* engages the exposed surface of insulating body 12 and is maintained in the stable position shown in FIG. 1. The provision of the exposed insulating area on the header surface for supporting the base connector 18 permits self-jigging of the subassembly 17 on a header which is otherwise of standard design, this construction can be used to mount a wide variety of semiconductor subassemblies.

The shape of the exposed insulating area between posts 15 and 16 prevents short circuiting of the base connector to the metal covering of the header since the connector will not contact the covering 11*a* even if it should be mounted in a tilted position as with one of its arms resting on the header. The provision of the metal cover 11*a* over other portions of the header body 12 improves electrostatic shielding of the unit.

It will thus be seen that the configuration of the base connector 18 and the provision of the bent-over end portions of posts 13 and 14 enables the subassembly 17 to be self-jigging with respect to header 11 so that solder connections can be made easily and accurately at a high rate of production with a high yield of electrically satisfactory units. Because the subassembly is self-jigging, soldering can be accomplished by placing solder rings or placing solder in some other manner on the assembly joints to be soldered and passing it through a furnace. This results in cleaner, better aligned and more uniform units than could be produced by manual soldering since manual soldering may cause smearing and dirtying and misalignment in handling to an extent that might result in an unacceptable unit.

Following the soldering operations, the units are removed from the belt 119 and placed in individual carriers which hold the lower portions of posts or leads 13, 14 and 15 in a fixed position and establishes a reference surface for loading in sockets of an automatic etching facility shown at 123 in FIG. 7. The units are plugged into sockets on a moving belt and carried successively through an electrolytic etching bath, a deionized water rinse, a pressurized air-water mist rinse, a high pressure air blow-off, a radiant heat drying position and an unloading position. The units then pass to electrical testing stations which may be provided with automatic sorting and ejection means. Although it is expedient to carry out the etching, washing and testing steps by the mechanized means described, the invention may also be practiced with these steps accomplished by other means whether mechanized or not, and the specific mechanism used in the commercial embodiment of the present invention is not a part of this invention.

Assembly of the transistor is completed by the attachment of cover member 46. The cover is made of mild steel or nickel silver and which rests on the lip or shoulder 11*b* of header 11. The cover member 46 is affixed to the header by welding to such shoulder.

Figure 11:
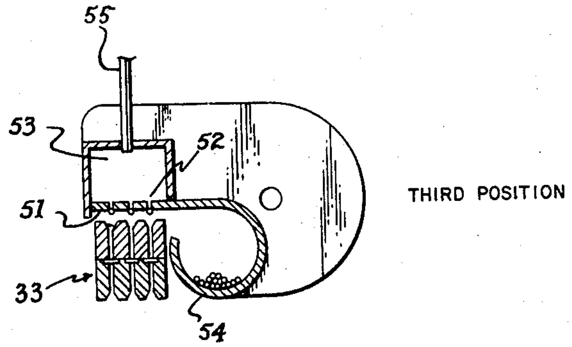
FIG. 11 is a view similar to FIGS. 9 and 10 showing the loading device turned through an additional angle of 90° from FIG. 10 and in position for releasing and dropping the electrode beads into the jig of FIGS. 4 and 5.
Figure 12:
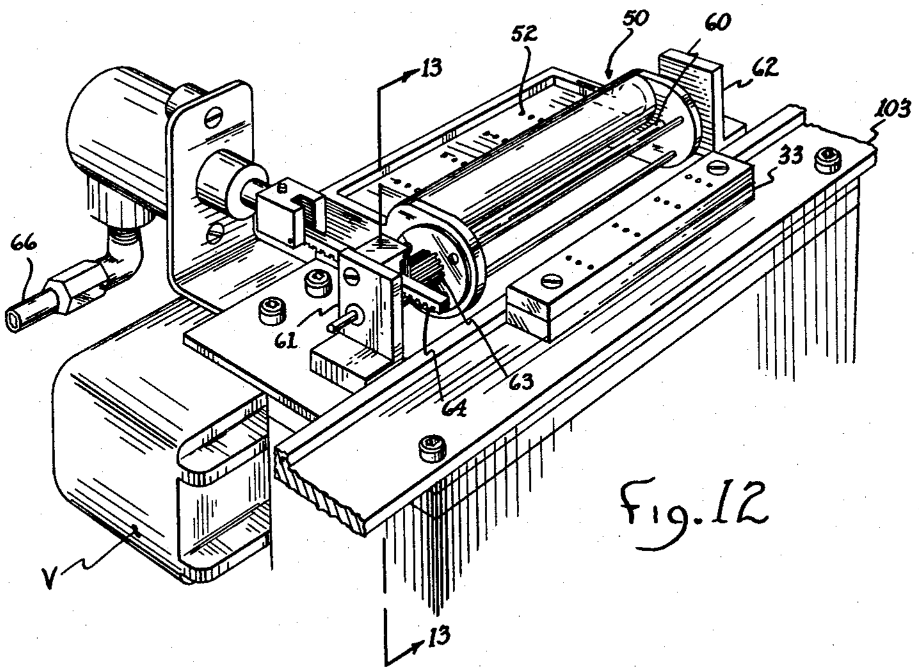
FIG. 12 is a perspecitve view showing in greater structural detail the loading apparatus illustrated diagrammatically in FIGS. 8–11, and including the operating mechanism for the loader.
Figure 13:
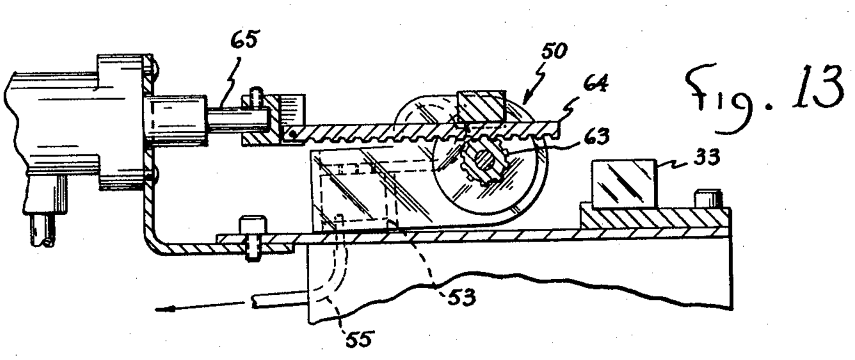
FIG. 13 is a view in section taken on the line 13—13 of FIG. 12.
Figure 14:
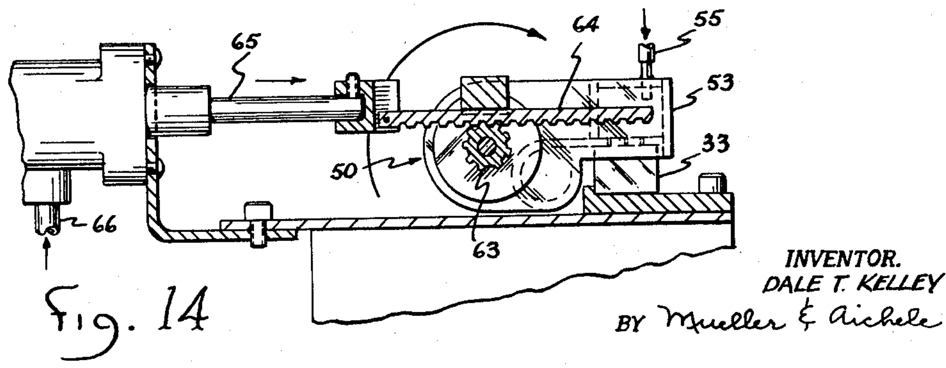
FIG. 14 is a view similar to FIG. 13 showing the loading apparatus turned to the position shown in FIG. 11 for releasing and dropping electrode beads into a jig.

The insertion of the collector and emitter beads at stations 104 and 108, by electro-pneumatic operated automatic loading means illustrated somewhat diagrammatically in FIGS. 8–11 and in greater structural detail in FIGS. 12–14 also illustrates the effectiveness of the present invention to handle minute parts. In a typical embodiment of the invention, emitter bead 29 is 0.007 inch in diameter, while the collector bead 30 is 0.014 inch in diameter. It is difficult and time consuming to pick up such small objects one at a time with tweezers or the like and insert them manually through the holes in the jig. The loading device indicated generally at 50 in FIG. 8 overcomes this problem. It includes a flat surface 51 having a series of openings 52 formed therein of smaller diameter than the electrode beads. Each opening 52 communicates with a vacuum chamber 53 within the unit, and one wall of the chamber 53 has the flat surface 51 on the outside thereof. A curved cradle portion 54 forms a continuation of the chamber wall and is adjacent the flat surface 51 on that wall. A number of electrode beads 29 are spread over the surface 51 and a partial vacuum is produced in the chamber 53 by exhausting air through conduit 55. The production of this partial vacuum is made possible by the fact that openings 52 are blocked by aligned beads 29. The device is then turned from its upright or first position shown in FIGS. 8 and 9 to the second position shown in FIG. 10. Because of the vacuum in chamber 53, the beads 29 which are aligned with the openings 52 are held against them by differential air pressure of the ambient atmosphere while the other beads fall into the cradle 54 as shown.

The loading device is then turned through another 90° to the third postion shown in FIG. 11, and each retained bead 29 is positioned over a corresponding passage in the jig 33 which contains the base connector, the solder ring, and the semiconductor die. The spacing between adjacent openings 52 corresponds to the spacing between adjacent passages in jig 33 so that proper positioning is possible. The vacuum is then turned off and positive air pressure introduced into the chamber 53 through the conduit 55. This disengages the beads 29 from the openings 52 and causes them to fall through the corresponding passages in the die and onto the surface of the semiconductor wafer directly below.

Use of the loading device 50 is substantially faster than manual loading and also results in loss of fewer electrode beads. By providing holes 52 of somewhat smaller size than the emitter electrode, the same device may be used for loading both the emitter and the larger collector beads.

FIGS. 12–14 illustrate in greater detail the mounting of ones of the bead loaders, and show how it is moved to its various positions. The loader 50 includes a transverse shaft 60 rotatably mounted in brackets 61 and 62 and carrying a pinion gear 63 adjacent one end. Jig 33 is brought into position for loading by suitable conveyor means indicated at 103. Flexible conduit 55 is connected to the chamber portion 53 to partially evacuate the same while the device is in its first position (FIGS. 12 and 13) so that beads can be held against the openings 52. Reciprocating rack 64 engages the pinion 63 and is actuated by air cylinder 65 which is in turn controlled by air supply conduit 66.

To load beads into jig 33, air cylinder 65 is moved forward to the position shown in FIG. 14 causing rack 65 to rotate pinion 63 turning loader 50 to its third position (FIG. 11). In this position, beads held to the openings 52 are aligned over openings in jig 33 and fall into the jig when positive air pressure is supplied to chamber 53 through conduit 55.

In order to insure rapid action of the beads in moving into positions aligned with the holes 52 of the loader and in dropping into the jig an electric vibrator V is provided in the mounting (FIG. 12) for the bead loader. This can be adjusted so that the vibration is very slight, but available if required.

To assist the accomplishing results of the present assembly method, the invention provides a jig for holding the parts of the semiconductor die assembly and a bead or pellet loader to quickly and reliably feed the minute metal electrode elements to the jig. Unless the semiconductor die subassembly for the final unit is complete, and with its parts aligned and mechanically and electrically joined, the final device is defective. The reliability of the process and apparatus of the present invention is an important factor in the commercial value of the whole. The equipment and techniques of the invention are easily modified to accommodate them to advances in the semiconductor art as represented in new developments in the semiconductor die and the subassembly including the same so that such equipment does not become obsolete prematurely.

I claim:

1. Apparatus for accurately positioning minute beads in predetermined positions for loading into a jig for alloying said beads to semiconductor disc, said apparatus including in combination, a flat positioning surface having a plurality of openings smaller than said beads formed therein in predetermined, spaced relation, said positioning surface forming one wall of an enclosed chamber, the pressure within which can be varied when the openings are blocked by beads aligned therewith, a curved cradle member having an edge portion coextensive with an edge of said positioning surface along the long dimension of said surface, means for turning said apparatus about an axis from a first position in which said positioning surface is horizontal and above said chamber to a second position in which said positioning surface is vertical and to a third position in which said positioning surface is horizontal and below said chamber, and means for varying the pressure within said chamber when the openings in said positioning surface are blocked by beads aligned therewith so that beads in such alignment are held there by reduction or pressure within said chamber when the apparatus is turned to said second position and beads spread over said positioning surface and not aligned with an opening therein fall into said cradle and the aligned beads may be dislodged from the corresponding openings by increasing the pressure in said chamber when the apparatus is turned to said third position for dropping the aligned beads into a jig.

2. Apparatus for simultaneously inserting a plurality of minute beads into a plurality of spaced apart apertures, said apparatus including in combination, an enclosed chamber, a positioning surface forming one wall of said chamber and having a plurality of openings formed therein, said openings being of such a size that they are blocked when beads to be loaded are aligned therewith, means for varying the air pressure within said chamber, a curved cradle portion extending from said positioning surface, a pair of brackets supporting said cradle portion at its ends, a pinion carried on one end of said cradle portion, a toothed rack engaging said pinion and means for actuating said rack to rotate said cradle portion about a horizontal axis, such rotation adapted to turn said positioning surface so that it is aligned above the aforesaid plurality of spaced apart apertures with beads held in alignment with the openings in said surface by reduction of air pressure in said chamber positioned for discharge into said apertures by an increase of air pressure in said chamber.

3. The method of simultaneously loading a plurality of fusible metal beads into a heat resistant jig which has a corresponding plurality of semiconductor elements therein and a bore between each such semiconductor element and the outside of the jig, which method includes pouring a plurality of said beads from a storage receptacle on to an upwardly facing surface of a loading structure which has apertures therein communicating with said surface at positions corresponding to the positions of said bores in said jig, applying suction to said apertures of said loading structure to collect and retain a bead at each of said apertures, pouring excess beads from said surface back into said storage receptacle positioning said loading structure over said jig and turning said loading structure over while maintaining suction at said apertures therein to place said beads over said bores in said carrier structure, and releasing the suction to drop said beads into corresponding bores in said jig for depositing the beads on the corresponding semiconductor elements in said jig.

4. A method of simultaneously loading a plurality of fusible metal beads into a heat resistant jig which has a corresponding plurality of semiconductor elements therein and a bore between each such semiconductor element and the outside of the jig, said method includig the steps of pouring a plurality of said beads on an upwardly facing surface of a loading structure which has apertures therein communicating with said surface at positions corresponding to the positions of said bores in said jig, vibrating said loading structure to distribute the beads on said surface to insure that each of said apertures receives a bead therein, applying suction to said apertures to retain a bead at each of said apertures, pouring excess beads from said surface to a storage receptacle while maintaining suction at said apertures to maintain a bead at each aperture, inverting said loading structure to place the beads at said apertures over said bores in said jig, and increasing the pressure in said apertures to drop said plurality of beads simultaneously into corresponding bores in said jig for depositing the beads on the semiconductor elements in said jig.

5. Apparatus for loading minute beads of fusible metal into corresponding bores of a jig for alloying said beads to semiconductor elements, said apparatus including in combination, closure means forming a chamber and having a plurality of openings communicating between said chamber and an external substantially flat surface of said closure means at positions corresponding to the positions of the bores in said jig, means supporting said closure means with said flat surface thereof facing upwardly, said closure means being movable on said supporting means to turn said flat surface to a downwardly facing position, means for simultaneously distributing a plurality of said beads randomly over said external surface of said closure means in said upwardly facing position thereof to provide a bead at each of said apertures and excess beads on said surface, means for varying the pressure within said chamber so that beads at said apertures are held thereon by reduction of pressure within said chamber, and means for turning said closure means to said downwardly facing position of said surface to remove such excess beads from said surface during the turning and then to position beads retained thereon over the bores in said jig so that said beads may be dropped into said bores by increasing the pressure within said chamber.

6. A method of simultaneously providing a plurality of small objects at receiving means, said method including the steps of distributing in a random fashion an excess of small objects on an upwardly-facing apertured substantially flat surface portion of an apparatus, applying reduced pressure to all of said apertures simultaneously to select and hold a predetermined quantity of said small objects with one thereof at each aperture, partially rotating said surface portion about an axis to remove all of said small objects not selected and retained at said apertures, continuing the rotation of said surface portion about said axis so that said surface faces downwardly, and changing the pressure on all of said apertures to simultaneously release all of said objects into receiving means.

7. In an apparatus for selecting a predetermined number of small objects for locating said objects relative to a previously located receiving means and for releasing said objects into said receiving means, the combination including an apparatus-portion having a substantially flat surface with a predetermined plurality of holes therein, means supporting said apparatus-portion with its surface facing upwardly and said apparatus portion being movable on the supporting means so that the surface thereof may be positioned to face downwardly, said apparatus-portion surface adapted to have a quantity of small objects placed thereon in a random fashion when said surface is in a position facing upwardly, means for simultaneously establishing reduced pressure in all of said holes to select from the quantity of objects one of said objects at each of said holes and retain each said object in a corresponding hole when the apparatus-portion is moved so that the face thereof is downwardly and any excess number of objects move therefrom during the movement of said apparatus-portion to such downwardly facing position of said surface and means acting to change said pressure simultaneously at all holes in said surface to simultaneously release all of said selected objects at the holes so that they may drop into receiving means.

8. In an apparatus for selecting a predetermined number of small objects for locating said objects relative to a previously located receiving means and for releasing said objects into said receiving means, the combination including an apparatus-portion having flat surface with a predetermined plurality of holes therein, means forming an axis and supporting said apparatus-portion with its surface facing upwardly and said apparatus portion being movable about said axis so that the surface thereof may be rotated about said axis to face downwardly, said apparatus-portion surface adapted to have a quantity of small objects placed thereon in a random fashion when said surface is in a position facing upwardly, means for simultaneously establishing reduced pressure in all of said holes to select from the quantity of objects one of said objects at each of said holes and retaining each such object in a corresponding hole when the apparatus-portion is rotated about said axis so that the face thereof is downwardly and any excess number of objects move therefrom during the rotation of said apparatus-portion to such downwardly facing position of said surface, and means acting to change said pressure simultaneously at all holes in said surface to simultaneously release all of said selected objects at the holes so that they may drop into receiving means.

9. A method of placing a plurality of small objects simultaneously at receiving means, said method including the steps of pouring a plurality of said objects from a receptacle on to an upwardly-facing surface portion of an apparatus having apertures in said surface portion to distribute on said surface portion a number of said objects in excess of the number of apertures therein, applying reduced pressure to said apertures to select and hold one of said objects at each of said apertures, partially rotating said surface portion about an axis to return the excess of said objects to said receptacle while maintaining reduced pressure at said apertures to retain an object at each aperture, continuing the rotation of said surface portion until said surface portion faces downwardly, and changing the pressure at all of said apertures simultaneously to release all of said objects into receiving means located under said downwardly-facing surface portion.

References Cited in the file of this patent

UNITED STATES PATENTS

| | | |
|---|---|---|
| 2,324,823 | Chilson et al. | July 20, 1943 |
| 2,546,838 | Tasche | Mar. 27, 1951 |
| 2,696,285 | Zenlea | Dec. 7, 1954 |
| 2,855,113 | Roske | Oct. 7, 1958 |
| 2,986,305 | Koerper et al. | May 30, 1961 |